United States Patent [19]
Schwartz et al.

[11] Patent Number: 5,894,597
[45] Date of Patent: Apr. 13, 1999

[54] COMMUNICATION DEVICE FOR DIFFERENT SIZED CARDS

[75] Inventors: Mark Schwartz, Wauconda; Gary Weiss, Buffalo Grove, both of Ill.

[73] Assignee: Motorola, Inc., Schaumburg, Ill.

[21] Appl. No.: 08/710,914

[22] Filed: Sep. 24, 1996

[51] Int. Cl.[6] .................................................. H04B 1/38
[52] U.S. Cl. ..................... 455/558; 455/90; 235/441; 235/486
[58] Field of Search ........................ 455/558, 409, 455/550, 347, 348, 349, 90; 235/486, 439, 441, 483, 492

[56] References Cited

U.S. PATENT DOCUMENTS

| | | |
|---|---|---|
| 4,142,312 | 3/1979 | Stokes . |
| 4,724,310 | 2/1988 | Shimamura et al. . |
| 4,743,746 | 5/1988 | Murschall et al. . |
| 4,780,604 | 10/1988 | Hasegawa et al. . |
| 4,876,552 | 10/1989 | Zakman . |
| 4,931,991 | 6/1990 | Cvijanovich . |
| 4,965,821 | 10/1990 | Bishop et al. . |
| 5,099,512 | 3/1992 | Shigami et al. . |
| 5,257,414 | 10/1993 | Trahan et al. . |
| 5,336,877 | 8/1994 | Raab et al. ......................... 235/475 |

FOREIGN PATENT DOCUMENTS

| | | |
|---|---|---|
| 276403 | 11/1986 | European Pat. Off. . |
| 214479A2 | 3/1987 | European Pat. Off. . |
| 241394A1 | 10/1987 | European Pat. Off. . |
| 254316A2 | 1/1988 | European Pat. Off. . |
| 274288A1 | 7/1988 | European Pat. Off. . |
| 282296A2 | 9/1988 | European Pat. Off. . |
| 316700A1 | 5/1989 | European Pat. Off. . |
| 378727 | 7/1990 | European Pat. Off. . |
| 0 503 434 A2 | 8/1992 | European Pat. Off. . |
| 0556970 A1 | 8/1993 | European Pat. Off. . |
| 2587549 | 3/1987 | France . |
| 1438685 | 6/1976 | United Kingdom . |
| 2192745 | 1/1988 | United Kingdom . |
| 2220777 | 1/1990 | United Kingdom . |
| 2 299 192 | 9/1996 | United Kingdom . |

OTHER PUBLICATIONS

ITT ElectoMechanical Components Worldwide. Brochure containing their range of Samrt Card Connectors. This brochure describes the available range of smart card connectors from ITT.

Amphenol Industrial Technology Division. Brochure containing various chip card readers.

Amphenol Industrial Technology Dvision. Catalogue containing Amphenol's range of chip card readers.

*Primary Examiner*—Wellington Chin
*Assistant Examiner*—Lee Nguyen
*Attorney, Agent, or Firm*—Randall S. Vaas

[57] ABSTRACT

A communication device (100) includes a card reader (102). The card reader includes a card support (104) for a first sized subscriber card (101). The card reader also accommodates a second size card (108) between the card support and a contact assembly (106).

12 Claims, 4 Drawing Sheets

5,894,597

1

COMMUNICATION DEVICE FOR DIFFERENT SIZED CARDS

FIELD OF THE INVENTION

The present invention pertains to communication devices, and more particularly to a communication device including an internal card reader.

BACKGROUND OF THE INVENTION

Communication devices, such as cellular radiotelephones, in some systems, such as the Global System for Mobile communication (GSM), use a subscriber card, such as a subscriber identity module (SIM). A SIM, such as a "smart card," includes an integrated circuit storing a subscriber identification number (subscriber ID). A card reader in the communication device reads the subscriber ID from the integrated circuit and a processor in the communication device uses this subscriber ID to execute a protocol for making or receiving a call. The protocol communicates the subscriber ED to a base station of the system. The system uses the ID for billing the call to the subscriber's account.

By providing the subscriber ID on the subscriber card instead of in the communication device, the communication device is not restricted to a single billing account. Any subscriber can use the communication device by inserting their card into the card reader. Calls made while the card is loaded are billed to the account associated with the card.

Cards such as SIMs are available in different sizes. Chip cards are not much larger than the integrated circuit, and thus measure approximately 25 mm by 15 mm, and are approximately 0.75 mm thick. Large cards, such as credit card size SIMs, are approximately 85.5 mm long by 54 mm wide and approximately 0.75 mm thick. Communication devices typically accommodate either a chip size SIM or a large size SIM, but not both. However, because communication devices only accommodate a single size card, only those users having a card sized for a communication device's card reader can use the communication device.

Accordingly it is desirable to provide a communication device with a card reader that accommodates multiple sized cards.

Figure 1:
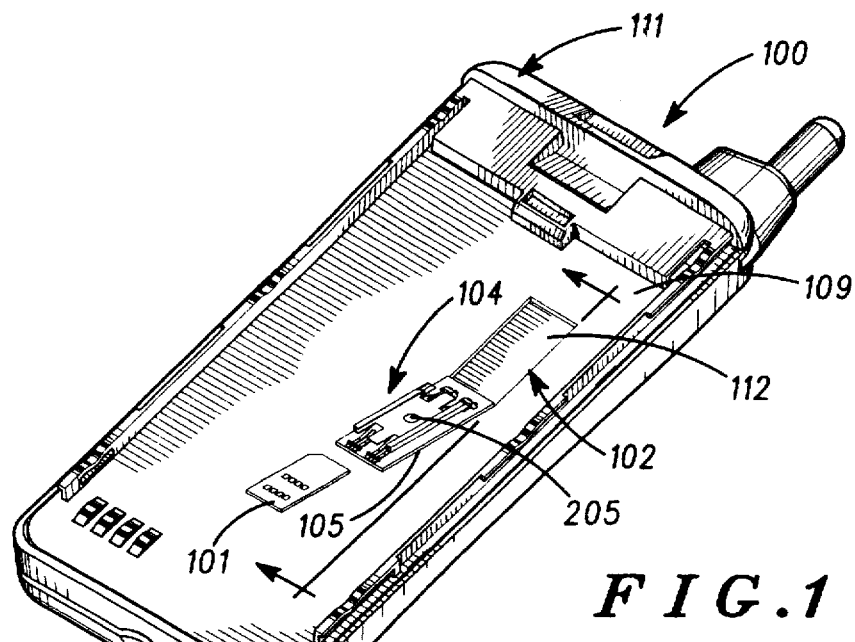
FIG. 1 is a left, right, and bottom perspective view illustrating a communication device and subscriber cards.
Figure 9:
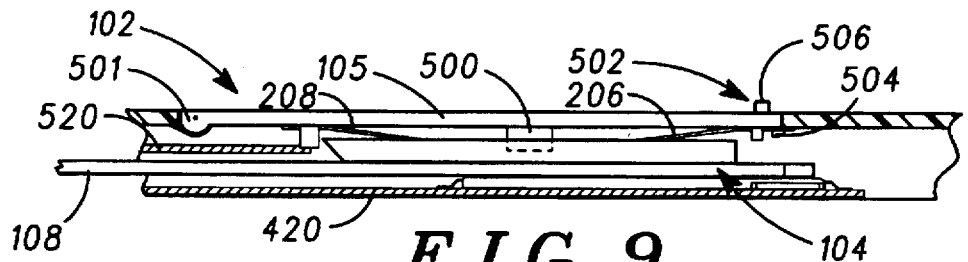
Figure 10:
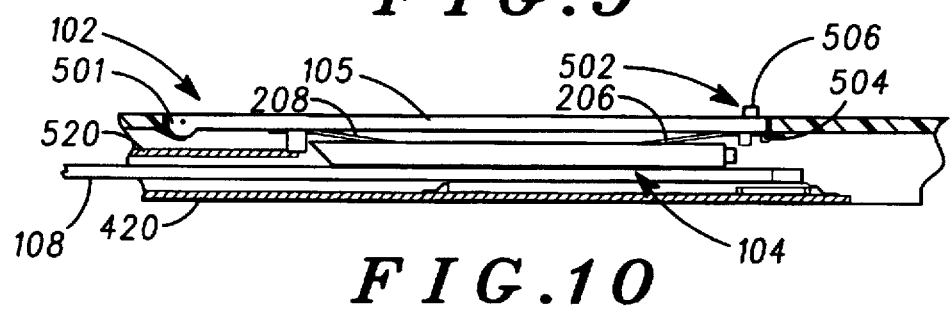

2 a large card being inserted through the device contacting the chip card support;

FIG. 9 is a side cross-sectional view of the communication device taken along the plane V—V in FIG. 1, no chip card in the card support, the door closed, and the large card fully inserted; and FIG. 10 is a side view of an alternate embodiment of the communication device taken along the same plane as plane V—V in FIG. 1 and with the door closed, a chip card in the chip card support, and a large card inserted in the device.

DETAILED DESCRIPTION OF A PREFERRED EMBODIMENT

A portable communication device 100 (FIG. 1) includes a card reader 102. The portable communication device can be a cellular radiotelephone, a two-way radio, a satellite telephone, or any other communication device employing a subscriber identification card, such as a SIM. The card reader accommodates a chip card 101 in a chip card support 104. The chip card support 104 is mounted on a door 105 that is opened to receive the chip card and closed to position the chip card on card reader contacts (416 in FIG. 4) of a contact assembly 106. A large card 108 is inserted into a slot 110 and slides between circuit board 112 and the chip card support 104. The large card 108 pushes the chip card support 104 away from contacts of the contact assembly 106 while the SIM moves through communication device 100. This allows the card reader 102 to accommodate either a large card 108 or a chip card.

The illustrated subscriber cards are a large card 108 SIM and a chip card 101 SIM which are commercially available SIMs used for GSM radiotelephones. However, the invention will have application for any subscriber card such as memory cards or the like.

Figure 2:
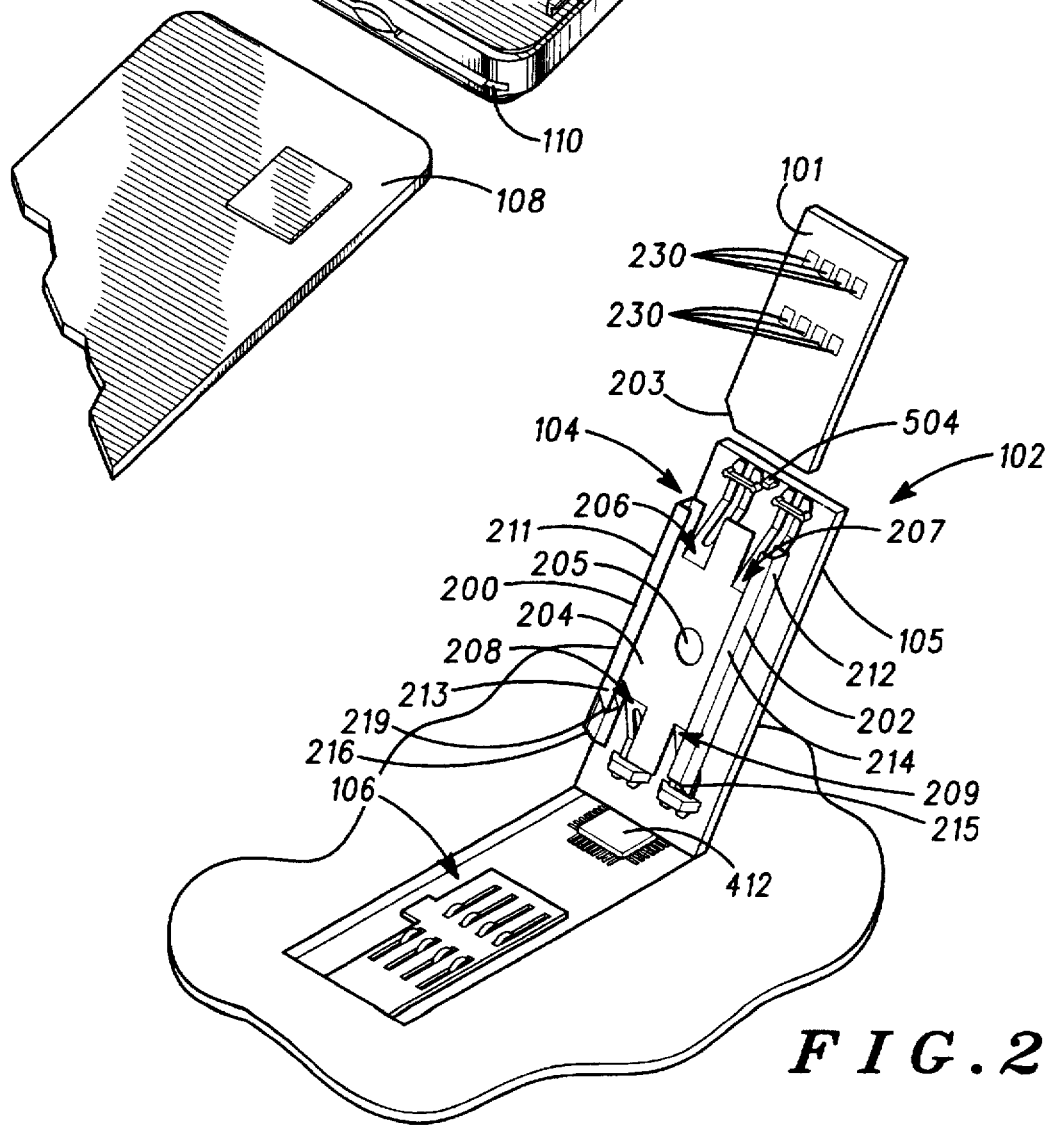
FIG. 2 is a perspective view illustrating a chip card support from the opposite direction of FIG. 1.

The chip card support 104 includes rails 200 (FIG. 2) and 202.

Rails 200, 202 are generally L-shaped, and extend outwardly from opposite sides of a slider plate 204 to create tracks for a chip card to ride in when inserted in the support. The sides 211 and 212 of rails 200 and 202 align the chip card over the slider plate 204. The top walls 213 and 214 hold the chip card against slider plate 204. One end 215, 216 of each of the rails 200, 202 are angled from the front edge toward the top walls 213 and 214 such that a large card 108 impacting the front edge of the support will push the chip card support 104 out of its way.

A stop 219 on rail 200 stops the chip card at a predetermined position when it is loaded. The position is such that contacts 230 on the chip card 101 are aligned with contacts (416 in FIG. 4) on contact assembly 106 when the door 105 is closed while the chip card 101 is loaded. The stop is angled to match the angle of an edge 203 of chip card 101 such that an angled edge of the chip card 101 will sit flush against the stop 219. This helps to prevent damage to the chip card 101 when it impacts the stop 219.

The slider plate 204 is a generally rectangular plate. It can optionally include aperture 205. The slider plate 204 is supported at a location spaced from the door 105 by elongate flat springs 206–209. One of the flat springs 206–209 extends outwardly from each corner of the slider plate 204.

Figure 3:
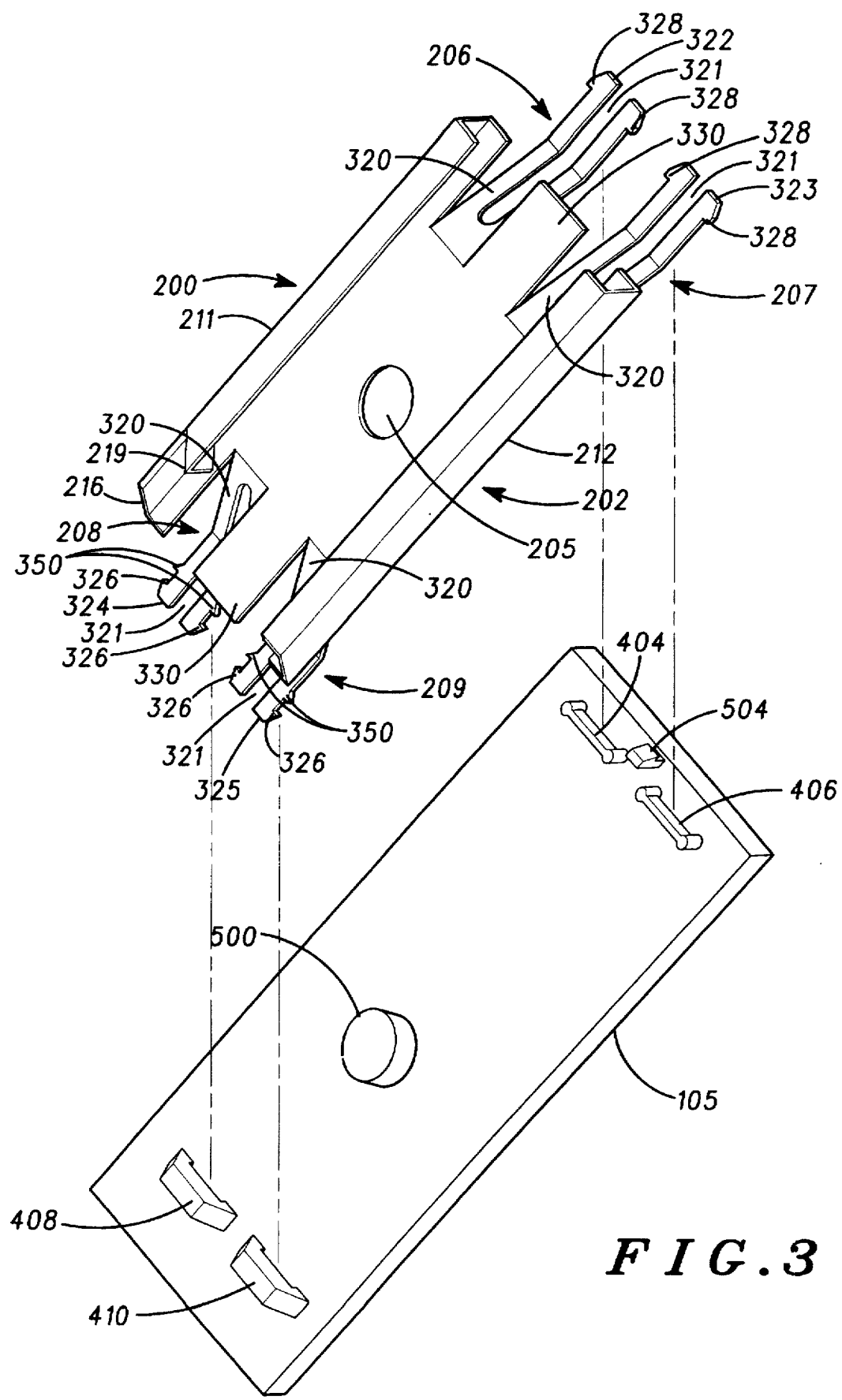
FIG. 3 is an enlarged exploded perspective view illustrating the chip card support of FIG. 2.

Flat spring 206 includes an arm 320 (FIG. 3) having a slot 321 through the middle thereof. The end of arm 320 includes a hand 322. The arm associated with flat spring 207 is identical to arm 320 and it includes a hand 323. Hands 322 and 323 include fingers 328. Flat spring 208 includes a hand 324 and flat spring 209 includes a hand 325. The hands 324 and 325 include fingers 326 and 350. The arms of flat springs 208 and 209 are identical to arm 320 with the exception of fingers 350. Platforms 330 extend outwardly from opposite ends of slider plate 204 to support the chip card 101 and thus help avoid breaking the card.

The chip card support 104 can be of any suitable construction, such as a stamped metal plate, or a molded organic polymer. If the chip card support 104 is a stamped metal piece, the rails 200 and 202 are bent upwardly from the slider plate and the flat springs 206–209 are bent downwardly from the slider plate after the piece is formed. The metal is sufficiently resilient that the flat springs 206–209 will flex and return to their original position if they are pressed and released.

Figure 4:
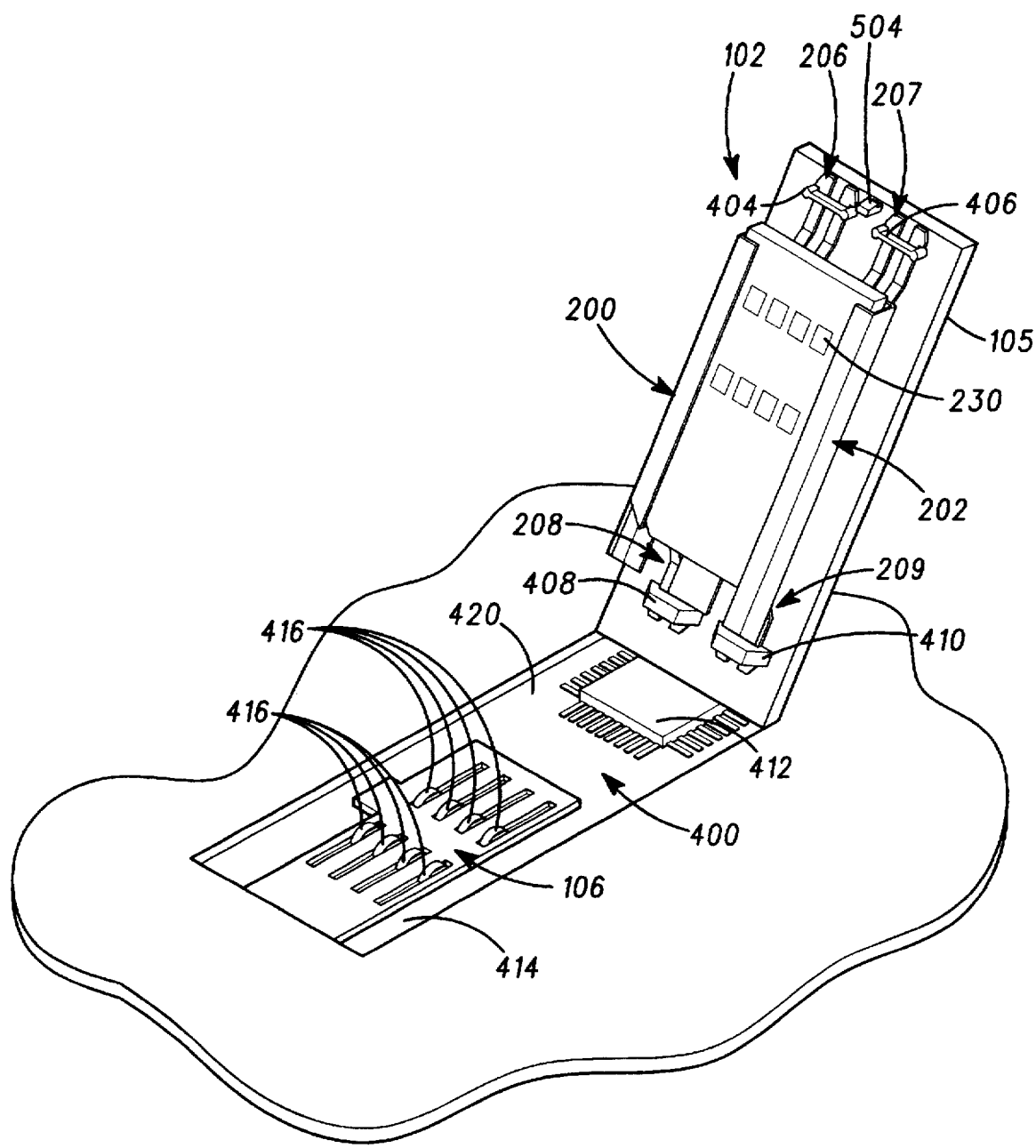
FIG. 4 is an enlarged perspective view illustrating the card reader of FIG. 2 with a chip card inserted in the chip card support and the communication device door open.

The door 105 includes U-shaped retainers 404 and 406 each of which forms an opening with the door 105 for receipt of hands 322 and 323 of flat spring 206 and 207, respectively. When inserted as shown in FIG. 4, the hands 322 and 323 slide freely in the retainers 404 and 406 to permit arms 320 of the chip card support 104 to retract. The door 105 also includes anchors 408 and 410 which receive the hands 324 and 325. The thickness of the anchors and the spacing between fingers 326 and 350 are approximately equal. Thus, when the hands 324 and 325 are inserted into anchors 408 and 410, the fingers 326 and 350 are positioned on opposite sides of the anchor and securely hold the hands 324 and 325 against sliding movement. Only hands 322 and 323 are permitted to slide to maintain the alignment of the chip card support 104 after it retracts and returns to its original position following insertion and removal of a large card 108. Retainers 404 and 406 and the anchors 408 and 410 can be integrally molded with door 105, if manufactured of a suitable molded organic polymer, or they can be assembled to the door using an adhesive, a fastener such as a screw or a nail, or the like, if they are constructed of metal, a polymer, or another suitable material.

A post 500 (FIG. 3) is optionally provided on door 105 and extends outwardly therefrom. The post 500 is cylindrical and aligned with aperture 205 in slider plate 204. The post 500 passes through aperture 205 if the chip card 101 is not loaded in the chip card support 104 when the door 105 is closed while a large card 108 is loaded, or if a large card 108 is loaded while the door 105 is closed, as described hereinbelow. The post 500 contacts the chip card 101 through the aperture 205 to prevent the slider plate 204 from moving away from the contact assembly 106 when a large card 108 is inserted into card reader 102 via slot 110 while a chip card 101 is loaded. If the chip card support 104 does not move out of the path of the large card 108, the support blocks insertion of the large card 108. If a large card 108 is loaded in the card reader, a chip card 101 is loaded in the chip card support 104 as illustrated in FIG. 4, and the user attempts to close the door, the chip card support 104 will contact the large card 108 while the post 500 contacts the chip card 101 preventing retraction of the chip card support 104. This prevents the door 105 from closing. Thus, the post 500 is provided to control the chip card support 104 to block insertion of both large card 108 and chip card 101 at the same time.

Alternatively, the post 500 can be omitted so that the chip card can be retained in the chip card support 104 while a large card 108 is inserted into the card reader. In this alternate embodiment, the chip card support 104 will move out of the path of the large card 108 when the chip card 101 is in the chip card support 104 and when the chip card is not in the chip card support 104, allowing both cards to be mounted. However, when a large card 108 is loaded in the communication device, and a chip card is loaded in the chip card holder, the large card 108 will be positioned between the chip card and the contact assembly. Thus, the account associated with the large card 108 will be billed, even though the small SIM is loaded last. Thus, it may be desirable to include the post if the communication device's owner has a large card 108, whereas it may be desirable to omit the post if the communication device's owner has a chip card. The post can be integrally molded with the door, or assembled to the door using a threaded fastener, an adhesive, or the like.

The door 105 is preferably constructed of the same material as the back wall 109 of housing 111 such that the door will blend into the back wall of housing 111. The door 105 is mounted to the back wall 109 by hinge 501, best seen in FIG. 5. Any suitable hinge construction can be utilized.

A latch mechanism 502 is provided to hold the door 105 in the closed position. Any suitable latch mechanism can be used, such as a hook 504 connected to a finger grip 506 that slides out of the locked position but is biased into the locked position by a spring (not shown). The hook grasps the inside surface of the back wall of housing 111 to hold the door closed. The door is released by pulling the hook away from the wall.

An electrical circuit 400 (FIG. 4), including a processor 412, is mounted on printed circuit board (PCB) 420. The card reader includes contacts 416 of contact assembly 106 supported on PCB 420 and electrically coupled to the processor 412. These contacts 416 are resilient and have a spring force. The spring force of the flat springs 206–209 is preferably equal to or greater than the spring force of contacts 416 to assure that the card contacts 230 and the contacts 416 maintain a good reliable electrical connection. The processor 412 communicates with the integrated circuit on the SIM (101 or 108) when the integrated circuit contacts (230 on chip card 101 or similar contacts, not shown, on large card 108), are connected to the contacts 416 of card reader contact assembly 106. The processor can be a microprocessor, a digital signal processor, or the like, and it performs conventional GSM or digital system cellular (DSC) call signal processing protocols with a SIM connected to the contact assembly 106.

To assemble the chip card support 104 to door 105, the fingers 326 of the hands 324 and 325 are pinched together and inserted into the anchors 408, 410. The fingers 328 of hands 322 and 323 are pinched together and inserted into retainers 404, 406. The fingers and arms are sufficiently resilient to allow some flexing and pinching and spring back to their original, rest position to hold the hands in the anchors and retainers.

Figure 5:
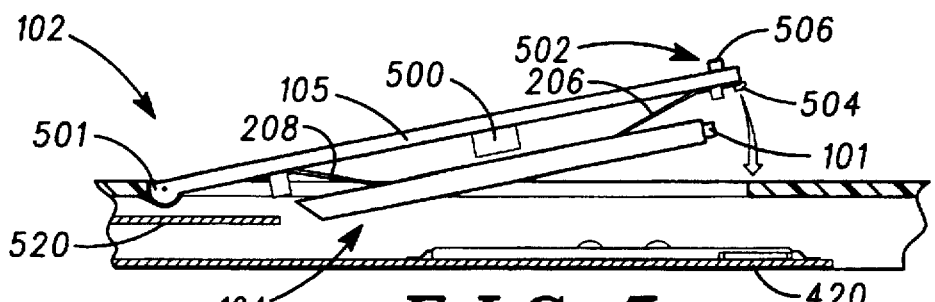
FIG. 5 is a side cross-sectional view of the communication device taken along the plane V—V in FIG. 1.
Figure 6:
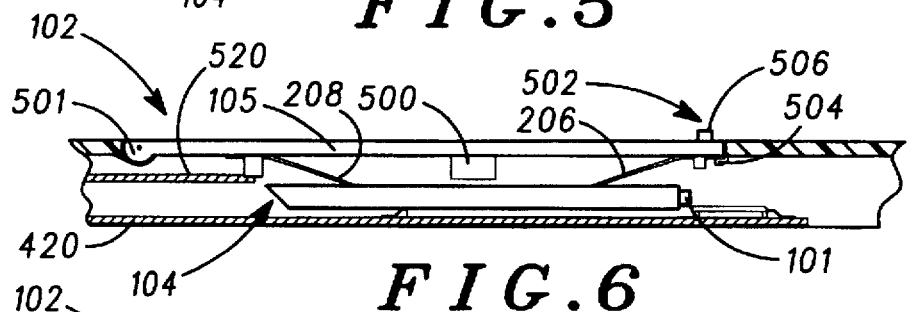
FIG. 6 is a side cross-sectional view of the communication device taken along the plane V—V in FIG. 1 and with a chip card in the card support and the door closed.

In operation, to load the chip card 101, the door 105 on the rear wall of housing 111 is opened, to the position of FIG. 1. The chip card support 104 is mounted on the door, such that it is accessible when the door 105 is opened. This permits ready access for inserting the chip card on the slider plate 204. To insert the chip card 101, it is inserted between the rails 200, 202 and slid across the slider plate until it contacts stop 219. When the door is closed as shown in FIGS. 5 and 6, the card is positioned against the contacts 416 of the card reader 102. The flat springs 206–209 hold the chip card against the contacts of contact assembly 106 and latch mechanism 502 holds the door closed.

Figure 7:
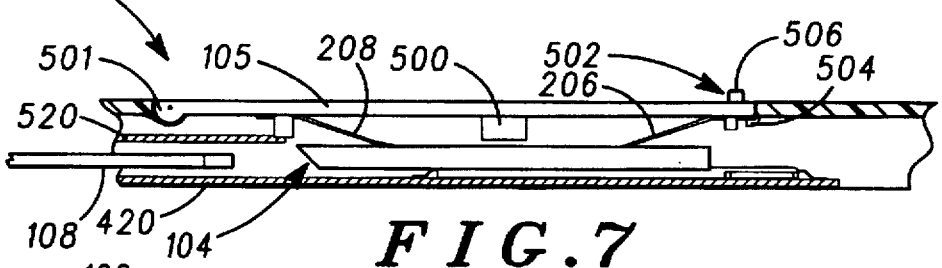
FIG. 7 is a side cross-sectional view of the communication device taken along the plane V—V in FIG. 1 and with the door closed, no chip card in the chip card support, and a large card being inserted through the device.
Figure 8:
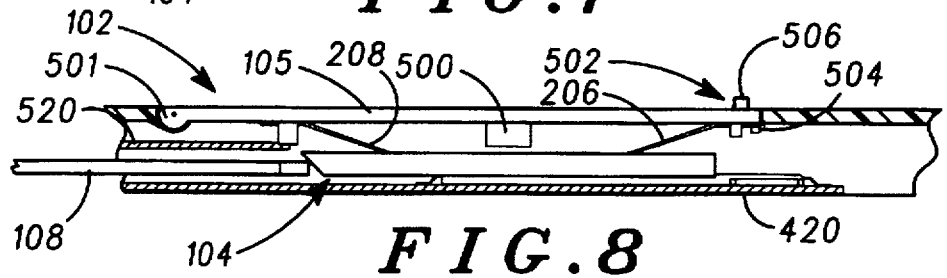
FIG. 8 is a side cross-sectional view of the communication device taken along the plane V—V in FIG. 1 and with the door closed, no chip card in the chip card support.

The large card 108 is loaded by inserting it through the slot 110. The large card 108 slides through the path between printed circuit board (PCB) 420 and PCB 520 (best shown in FIG. 7) until it contacts the chip card support 104 (FIG. 8). In the embodiment of FIGS. 7–9, which include post 500, and with no chip card loaded, the large card 108 slides across the angled walls pushing the chip card support 104 away from the contact assembly 106 and toward the door 105. Post 500 slides through aperture 205. The flat springs 206 and 208 are pressed downwarldy while the hands 322 and 323 slide through the retainers 404 and 406 while flat springs 208 and 209 are held by anchors 408 and 410. The large card 108 slides past the retracted chip card support 104. When fully inserted (FIG. 9), contacts (not shown) on the integrated circuit of the large card 108 are aligned with the contacts of contact assembly 106. The flexible flat springs are resilient to return to their original position, but are prevented from doing so by the presence of the large card 108 between the chip card support 104 and the contact assembly 106. The chip card support 104 thus presses the large card 108 into the contact assembly 106. The large card 108 is thus securely pressed against the contacts of contact assembly 106. When the large card 108 is removed, the chip card support 104 returns to its rest position (FIG. 7).

Because hands 324 and 325 are secured to anchor 408, 410, the alignment of the chip card support 104 and contact assembly 106 is maintained. This is important for maintaining the alignment of the chip card 101 and the contact assembly 106. The chip card 101 must be positioned is such that contacts 230 will connect to contacts 416 if the chip card edge abuts with stop 219.

If the chip card support 104 includes an aperture 205 and post 500 is provided on door 105, the large card 108 can not be inserted when a chip card 101 is loaded in the chip card support 104. The post will contact the chip card 101 preventing the chip card support 104 from retracting. Additionally, post 500 blocks retraction of the chip card support 104 such that door 105 can not close when a chip card is loaded in chip card support 104 and a large card 108 is loaded in the communication device 100. The post 500 may be desirable if the communication device's owner has a large card, and the owner does not want the account associated with the large card to be charged when a chip card is loaded while the large SIM is also loaded. If a chip card 101 is not inserted in the support, the post will pass through the aperture 205. This permits the chip card support 104 to be retracted while a large card 108 is loaded or permits the door 105 to close if it is open while a large card 108 is loaded in card reader 102.

If the post 500 is omitted, as shown in FIG. 10, the chip card support 104 having the chip card loaded will slide out of the way when the large card 108 is loaded. This allows someone to borrow communication device 100 and use their large card 108 such that the call is charged to the borrowers large card 108 and not to the billing account associated with the chip card 101. The post 500 may not be desirable where the communication device's owner has a chip card. A borrower can insert the large card which will slide in without the user having to remove the chip card, which is small and could be accidentally lost if removed.

Thus, it can be seen that a communication device is disclosed that includes a card reader accommodating different sized cards. Because different sized cards can be readily accommodated in the card reader, the user does not have to match the communication device to their subscriber card. This provides greater flexibility and improves subscriber access to communication devices. Additionally, the flat springs of the chip card support preferably have force characteristic such that the chip card support presses the chip card and the large card 108 into the contact assembly with a force at least equal to the force exerted by the contacts of the contact assembly to thereby maintain electrical contact between a card and the contact. The chip card support thus assures that the card will operate in the communication device by providing reliable connection of the loaded card and the card reader with a single set of contacts for both large and small sized cards.

What is claimed is:

1. A communication device comprising:
   a housing;
   a contact positioned in the housing for connection to a circuit on a card;
   a card support movingly carried on the housing for receipt of a first sized subscriber card and for positioning the first sized subscriber card to couple to the contact; and
   a subscriber card path through the housing for receipt of a second sized subscriber card between the card support and the contact: the card support including an angled stop, the card support moves away from the contact when a second sized subscriber card is inserted into the subscriber card path and abuts with the angled end, and the card support presses the second sized subscriber card into the contact for reading.

2. The communication device as defined in claim 1, wherein the housing includes a subscriber card opening aligned with the subscriber card path.

3. The communication device as defined in claim 1, wherein the card support further includes rails to receive the first sized subscriber card and the angled end being positioned at an end of the rails.

4. The communication device as defined in claim 1, wherein the card support includes springs having a force characteristic at least equal to a force characteristic of the contact to maintain electrical contact between a card and the contact.

5. The communication device as defined in claim 4, wherein the springs are flat springs.

6. The communication device as defined in claim 1, wherein the subscriber card path extends along at least one printed circuit board having integrated circuits and the contact thereon.

7. The communication device as defined in claim 1, wherein the card support includes a slider plate, the slider plate supported by at least one flat spring.

8. The communication device as defined in claim 7, wherein the at least one flat spring is supported on a hand that slides through a retainer as the card support moves toward the contact.

9. A communication device comprising:
   a housing;
   a contact positioned in the housing for connection to a circuit on a card;
   a card support movingly carried on the housing for receipt of a first sized subscriber card and for positioning the first sized subscriber card to couple to the contact; and
   a subscriber card path through the housing for receipt of a second sized subscriber card between the card support and the contact:
   wherein the card support includes an opening aligned with a post, the post entering into the opening while the card support moves towards the contact when a first sized card is positioned in the card support, the opening blocked when the first sized subscriber card is supported in the card support whereby the post prevents movement of the card support toward the contact when the first sized subscriber card is supported in the card support.

10. The communication device as defined in claim 9, wherein the card support includes a slider plate, the slider plate supported by springs.

11. The communication device as defined in claim 9, wherein the first sized card extends across the opening when the first sized card is inserted into the card support such that the post impacts the first sized card preventing further movement of the card support.

12. The communication device as defined in claim 10, wherein the springs are supported on hands that slide through at least one retainer as the card support moves toward the contact.

* * * * *